(12) United States Patent
Benjamin

(10) Patent No.: US 6,758,326 B1
(45) Date of Patent: Jul. 6, 2004

(54) TELESCOPING CONVEYOR SYSTEM

(76) Inventor: Colin William Benjamin, Unit 9, 7-29 Bridge Road, Stanmore NSW (AU)

(*) Notice: Subject to any disclaimer, the term of this patent is extended or adjusted under 35 U.S.C. 154(b) by 6 days.

(21) Appl. No.: 10/331,020

(22) Filed: Dec. 27, 2002

(51) Int. Cl.⁷ ............................................... B65G 15/60
(52) U.S. Cl. ...................................... 198/812; 198/594
(58) Field of Search .................... 198/588, 594, 198/595, 812, 861.1, 678.1, 465.4; 104/110, 118

(56) References Cited

U.S. PATENT DOCUMENTS

| | | | | |
|---|---|---|---|---|
| 3,920,115 A | * | 11/1975 | Craggs | 198/812 |
| 4,896,764 A | * | 1/1990 | Neunzert | 198/812 |
| 5,590,757 A | | 1/1997 | Walter et al. | 198/812 |
| 5,938,004 A | * | 8/1999 | Roberts et al. | 198/812 |
| 6,095,320 A | * | 8/2000 | DeMong et al. | 198/812 |
| 6,481,566 B1 | * | 11/2002 | Horak | 198/812 |

FOREIGN PATENT DOCUMENTS

| | | |
|---|---|---|
| AU | 15073/83 | 12/1983 |
| DE | 29802385 U1 | 7/1998 |
| GB | 2032873 A | 5/1980 |

* cited by examiner

Primary Examiner—James R. Bidwell
(74) Attorney, Agent, or Firm—Cohen, Pontani, Lieberman & Pavane

(57) ABSTRACT

A support system for a conveyor comprising an overhead monorail of substantially closed form cross section pipe; carriages adapted to pass up and down the rail on wheels bearing on the rail; hanging frames suspended from the carriages having guide and support rollers beneath their point of attachment with the carriages; the guide and support rollers carrying and guiding an endless conveyor; the carriages and associated frames being slideable longitudinally along the rail on such wheels so as to increase or decrease the spacing between adjacent frames and hence the length of the conveyor; flanges or other attachment points on the rail to facilitate attachment of the rail to an overhead support; the overall length of the rail and hence conveyor being adjustable by adding or removing lengths of rail.

18 Claims, 8 Drawing Sheets

TELESCOPING CONVEYOR SYSTEM

The present invention relates to a conveyor system and in particular to a support system for a conveyor system which is adapted to facilitate simplified expansion or contraction of the length of the conveyor.

For many years conveyors have been utilised in underground mining and tunnel creation projects. The conveyors are usually of a type involving an endless belt system in which the belt moves in one direction when it is carrying whatever is being mined or removed with the belt returning in the opposite direction to the extremity when it changes from the return path to the load bearing path. An elaborate structure of load bearing and guide rollers must be established in order to define the belt path and to support both the weight of the belt and the weight of the payload. The rollers are typically supported on frames which are placed at discrete intervals and anchored in the underground tunnel by some means. The frames may rest upon the floor or alternatively may be hung by chains from a roof or brackets from a wall, or a combination of these in order to gain the requisite stability.

As underground mining or tunnelling operations progress it is necessary to lengthen or shorten the conveyor. For example, with long wall coal mining the main gate conveyors are continually being shortened after initial erection as the cutting apparatus at the coal face progresses back towards the trunk road. At the same time the trunk conveyor is typically being lengthened so as to accommodate further blocks to be mined.

Although loop take-up arrangements are available to facilitate lengthening or shortening of the belts associated with such conveyors by up to two hundred and fifty meter sections, the addition or removal of frames necessary to support the rollers associated with the conveyor system is a time consuming process. This process is also hazardous as the frames must be carried up and down the tunnels through which the conveyor passes, often whilst the conveyor is in operation. The erection and stripping down of the roller support frames is time consuming and results in down time for and damage to mining or tunnelling projects thereby resulting in considerable inefficiencies.

Accordingly the object of the present invention is to ameliorate one or more of the above-mentioned disadvantages associated with existing underground conveyor systems or alternatively to provide the market with an alternative conveyor system.

According to the present invention there is disclosed a support system for a conveyor comprising an overhead monorail of substantially closed form cross section pipe; carriages adapted to pass up and down the rail having load bearing, relative motion facilitating, low friction means adapted to run along one or more surfaces of the rail; hanging frames suspended from the carriages having guide and support rollers beneath their point of attachment with the carriages; the guide and support rollers being adapted to carry and guide an endless conveyor; means to slide the carriages and associated frames longitudinally along the rail so as to increase or decrease the spacing between adjacent frames and hence the length of the conveyor; means to attach the rail to an overhead support and means to lengthen or shorten the rail by adding or removing lengths of rail.

The term "substantially closed form cross section pipe" where used herein means a rail of a cross sectional view which is substantially closed in configuration unlike for example an I-beam but including a substantially box section rail as depicted in FIG. 10 hereof having a single continuous longitudinal slot which slot in cross-section appears as a small discontinuity in one side of the cross-sectional view.

A number of embodiments of the present invention will now be described with reference to the accompanying drawings in which.

Figure 1:
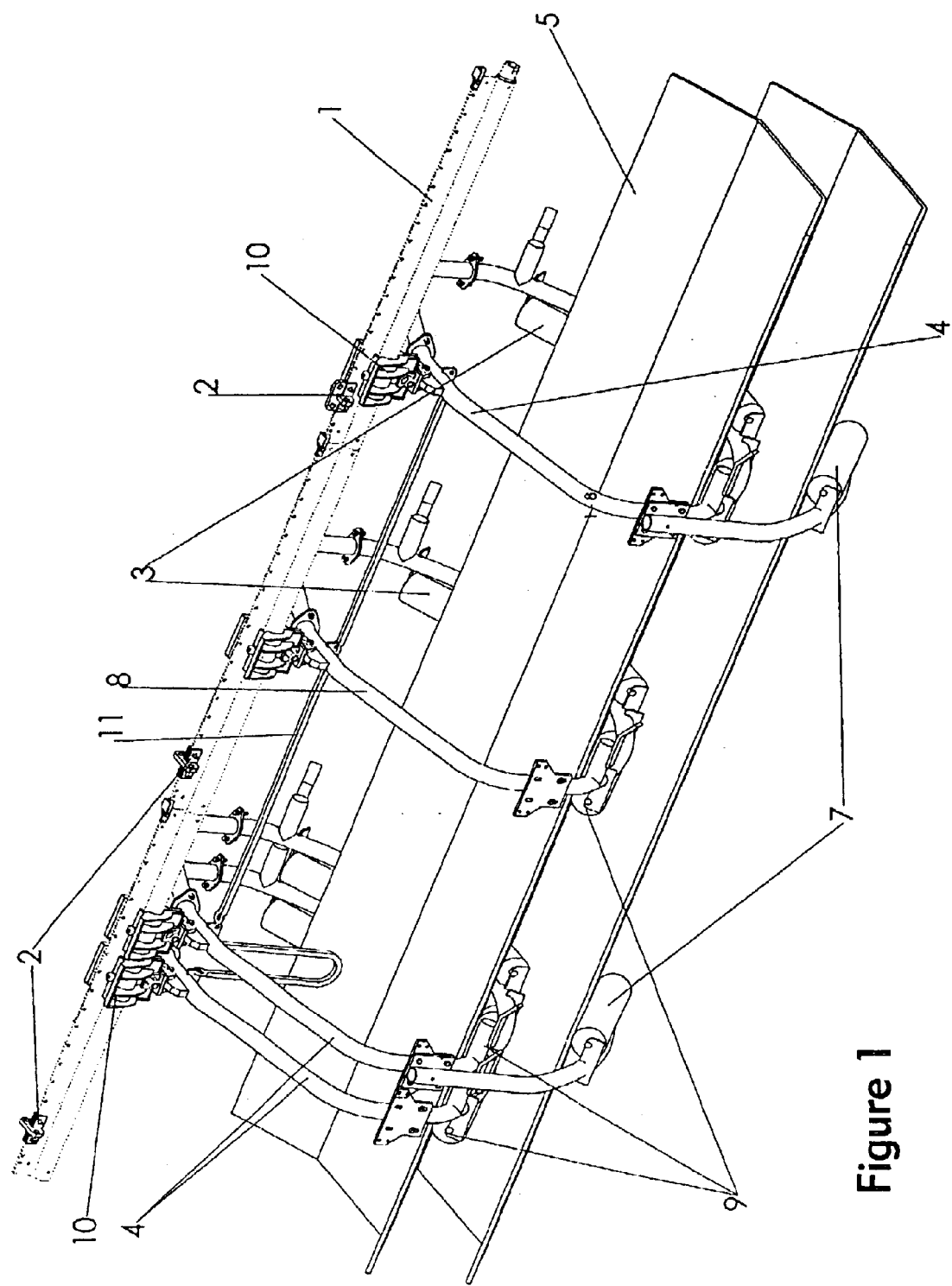
FIG. 1 is a perspective partial view of a conveyor system in accordance with the present invention.

According to the embodiment of FIG. 1 there is disclosed a conveyor system in accordance with the present invention incorporating an overhead circular cross section monorail 1 adapted to be bolted or otherwise secured to the roof (not shown) of a tunnel by way of brackets 2 or otherwise.

Figure 6:
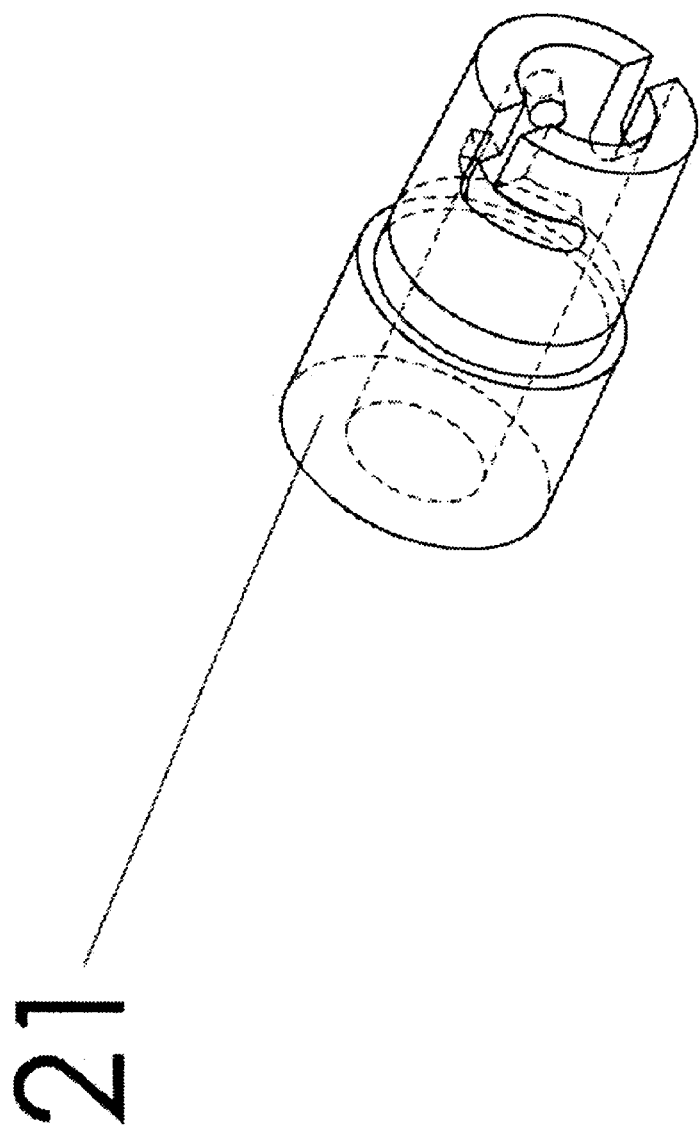
FIG. 6 is a perspective view of the male portion of a bayonet device for joining sections of rail in accordance with the system of FIGS. 1–5 hereof.
Figure 7:
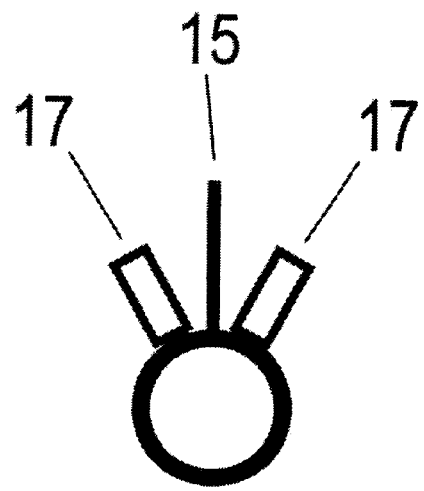
FIG. 7 is a partial end elevation of a circular cross section monorail in accordance with the present invention.

Discrete monorail sections (not shown) maybe locked together using a male to female bayonet fitting, the male portion of which is depicted at 21 of FIG. 6, thereby ensuring that the pipe monorail sections are firmly affixed to eachother. The Male bayonet fitting may simply be inserted into an end of an adjacent section of monorail pipe such as is depicted at 14 in FIGS. 3 and 4. The male bayonet fitting engages pin 22 which it captivates after relative rotation of the two sections of monorail.

Rollers 3 are supported on frames 4 which rollers in turn guide belt 5 which is adapted to carry a payload (not shown). The same belt returns in the opposite direction running upon rollers 7 also journaled on frames 4.

It will be noted that two different types of frames are provided these being frames 4 above-mentioned which support the belt irrespective of its direction of travel, and interspersed between frames 4 are an alternate design of frame 8 which are only intended to support the belt when travelling in its payload direction by way of rollers 9. Frames 8 have no lower arm adapted to journal rollers 7 to support the belt in its return mode. This is due to the fact that the belt requires more support when bearing a payload than when returning in the opposite direction empty.

The frames 4 and 8 are supported adjacent their upper extremities by affixation to carriages 10, which carriages in turn are affixed about rail 1 in such a manner that they may slide longitudinally along the rail. This longitudinal sliding may be facilitated by way of wheels or rollers (not shown) within the carriages or otherwise as is common in connection with monorail systems.

The affixation of the frames to carriages 10 may be by way of a pivot pin 19 (FIG. 3) which facilitates some arcuate movement of the frame in a plane normal to that of the rail or alternatively by two pivot pins normal to each other the second of which, 20, facilitates arcuate movement of the frame in a plane parallel to the rail.

The maximum spacing of the frames 4 and 8 along the rail may be defined by cables chains or ropes 11 joining adjacent frames. When the frames are expanded to their maximum spacings as depicted at the right hand side of FIG. 1 the frames may be maintained in such a maximum spaced position by chaining or otherwise securing them to the tunnel or alternatively locking carriages 10 onto rail 1 by locomotives about the rail.

As will be appreciated from the left-hand extremity of FIG. 1 adjacent frames may be brought into close contact with each other with adjacent carriages 10 touching each other so as to minimise the length of the conveyor system. If lengths of overhead rail are removed at the same time and conventional loop take-up arrangements are activated so as to minimise the length of belt it will be appreciated that the length of a conveyor may be considerably shortened.

Once the conveyor has been shortened to the extent that it is necessary to remove frames then a pod type arrangement (not shown) may be utilised in order to remove a number of frames at one time. The pod itself is mobile and contains a length of rail (not shown) of the same cross section as rail 1. When the rail of the pod (not shown) is brought up to a free end of rail 1 carriages, 10 ,with attached frames 4 and 8 may be pushed onto the rail of the pod and hence freed from main rail 1. The pod containing a number of frames may then be moved to an alternate location for storage or for addition to a section of conveyor that requires lengthening.

It will be noted from FIG. 1 that in this embodiment the rollers 3 and 7 are staggered either side of the frames in order to facilitate even loading of the frames and maximum support for the conveyor belt (not shown). In alternate embodimenta rollers may be located in alignment (same side of frame) to suit belt to roller interfaces. In such cases, balance of frames 8 and 4 would be achieved by modifications to its fixtures to carriage 10

Figure 2:
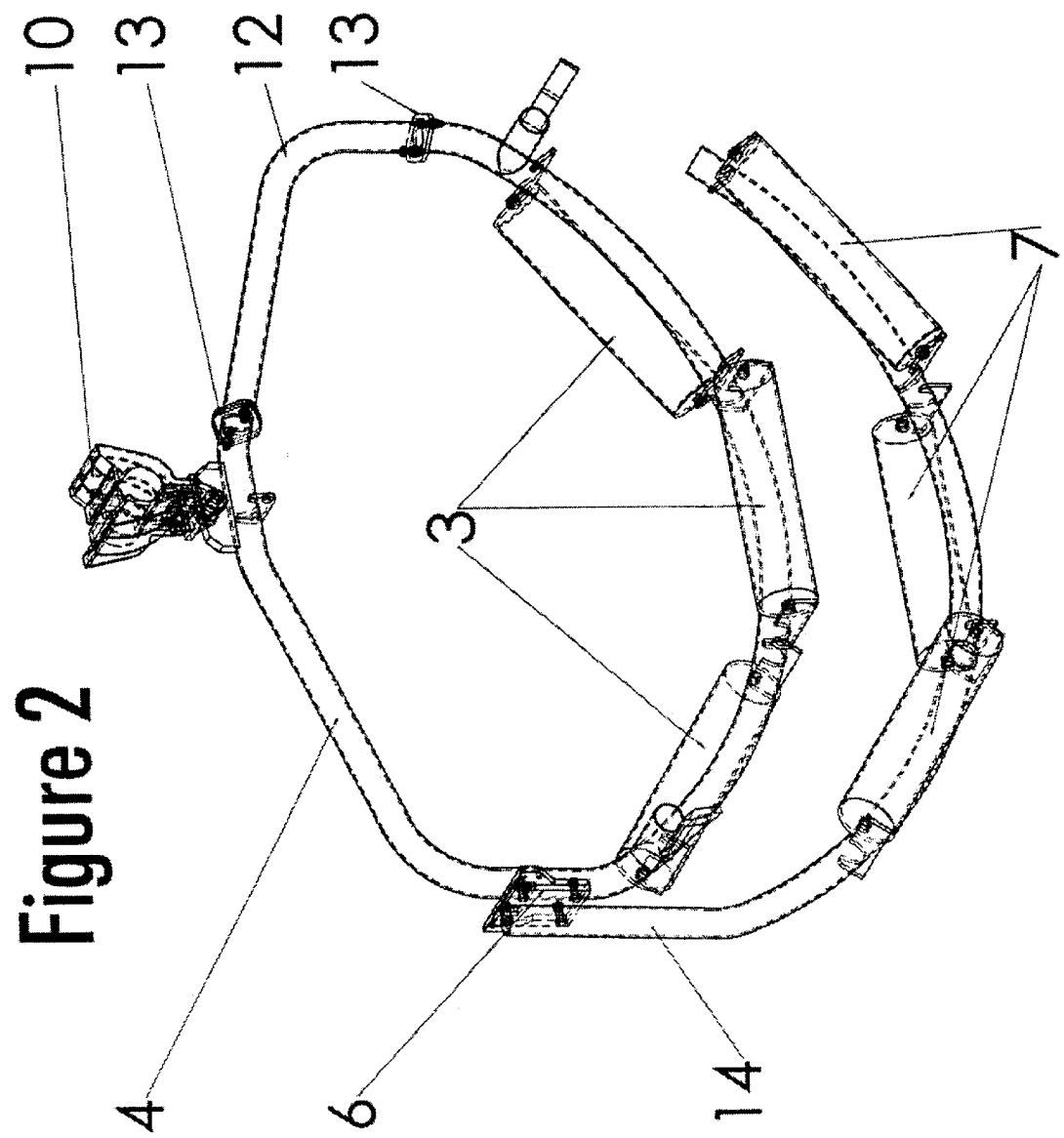
FIG. 2 is a perspective view of one of the frames associated with the conveyor system of FIG. 1.

With reference to FIG. 2 it may be seen that frames 4 are substantially in the shape of a small "e" and possess a removable section 12 which bolts up via unions 13 to the upper part of the "e". This section 12 may be removed in order to facilitate belt insertion or removal. Insertion or removal of the return portion of the belt of course is facilitated by the open nature of the bottom section carrying rollers 7. The upper portion of frame 4 may furthermore be disassembled from the lower portion 14a carrying roller 7 at joining plate 6 so that the frame 4 may be converted to a frame of type 8 depicted in FIG. 1 which provides no support for the return path of the belt.

Figure 3:
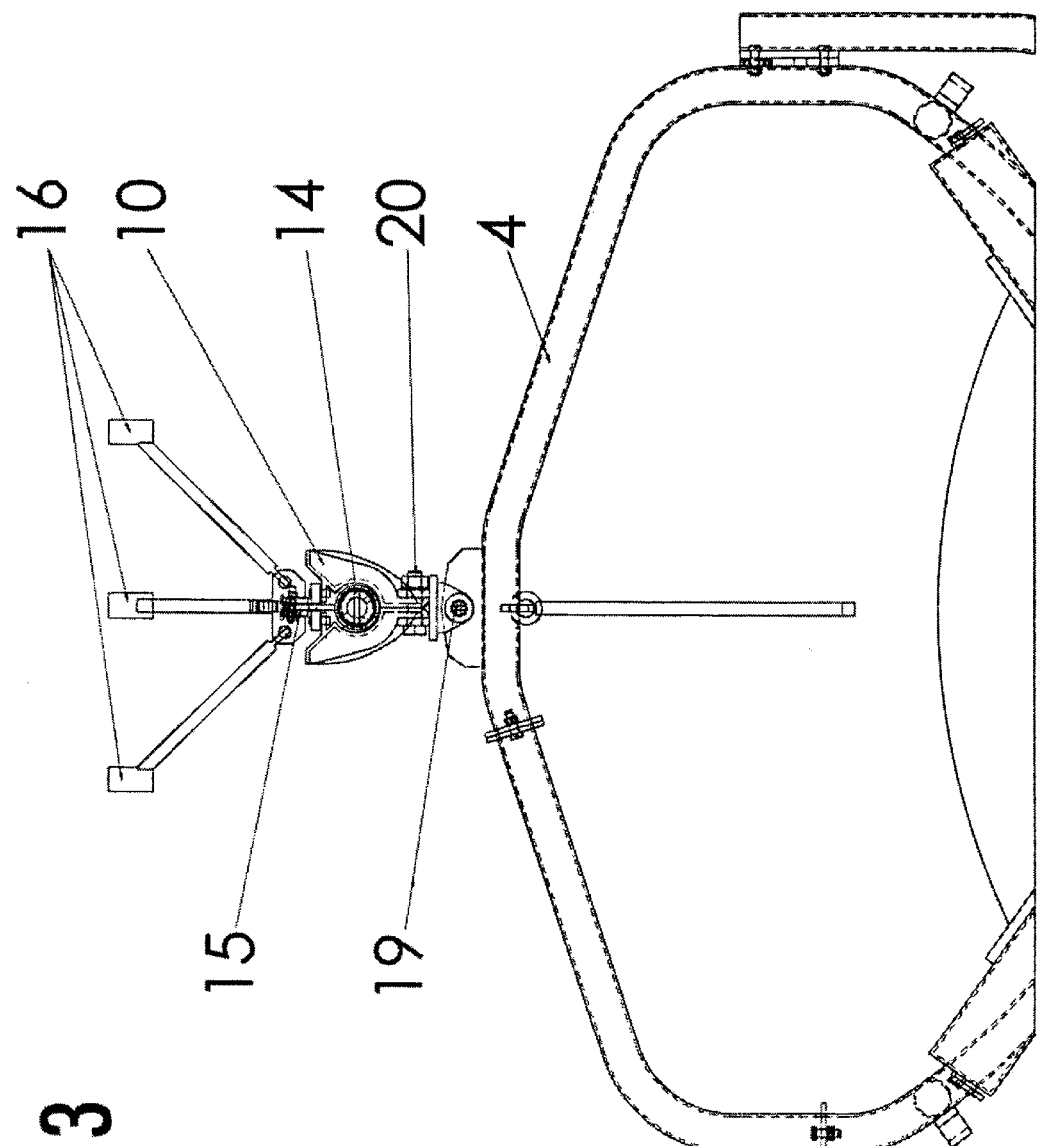
FIG. 3 is a front elevation of the rail, carriage and upper frame of the conveyor system of FIGS. 1–2 hereof.

With reference to FIG. 3 there is depicted in cross section part of a system in accordance with the present invention as described hereabove comprising a circular cross section pipe rail 14 being supported from above by way of a continuous flat bar 15 welded thereto and being normal to a tangent to the circular cross section rail. This continuous flat bar 15 is supported by roof mounted arms 16 in this instance. Carriage 10 is depicted in place about circular cross section rail 14 although the wheels which support the carriage for slideable motion along circular cross section pipe 14 are not depicted in this figure but are depicted in FIG. 4 hereof and referenced by numerals 17 and 18.

With reference to FIG. 3 carriage 10 supports frame 4 therebeneath by way of longitudinal pivot 19 and transverse pivot 20.

Pivot 19 and to a lesser extent pivot 20 enhance the anti-jamming and self-aligning characteristics which make the present system superior to existing conveyor support systems. It will be appreciated that frame 4 may pivot about pivot 19 in the event of uneven loading of the conveyor therebeneath so as to cause the frame to self-align with adjacent frames and permit continued free running of the conveyor supported by such frames.

Figure 4:
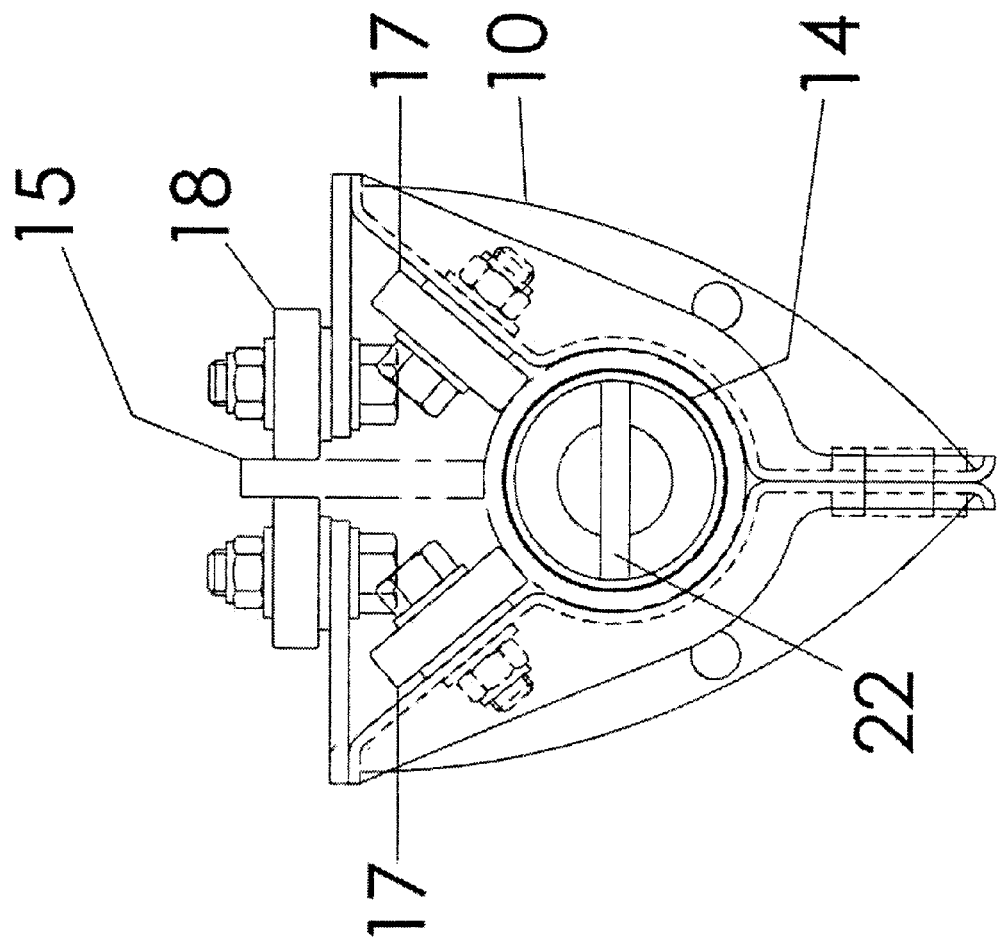
FIG. 4 is a transverse section through a carriage of the system of FIGS. 1–3 hereof.

With reference now to FIG. 4 it may be seen that the carriage 10 is provided with two sets of wheels 17 and 18. Wheels 17 are angled with respect to continuous flat rail 15 at an angle of between thirty degrees and fifty-five degrees and ideally at about forty degrees. It is these wheels that transfer the weight of the carriage frame and conveyor to the circular cross section part 14 of the monorail. It is envisaged that each carriage would contain four such wheels with two on each side of the rail and the pair on each side of the rail longitudinally aligned with each other. It has been found that with two longitudinally aligned wheels on either side of the carriage in combination with the circular section rail and pivot 20 twisting of the frames 4 with respect to their normal perpendicular alignment to rail 4 does not cause jamming of the carriage on the rail. Jamming of the carriages on the rails is a problem inherent in dual rail systems.

Figure 5:
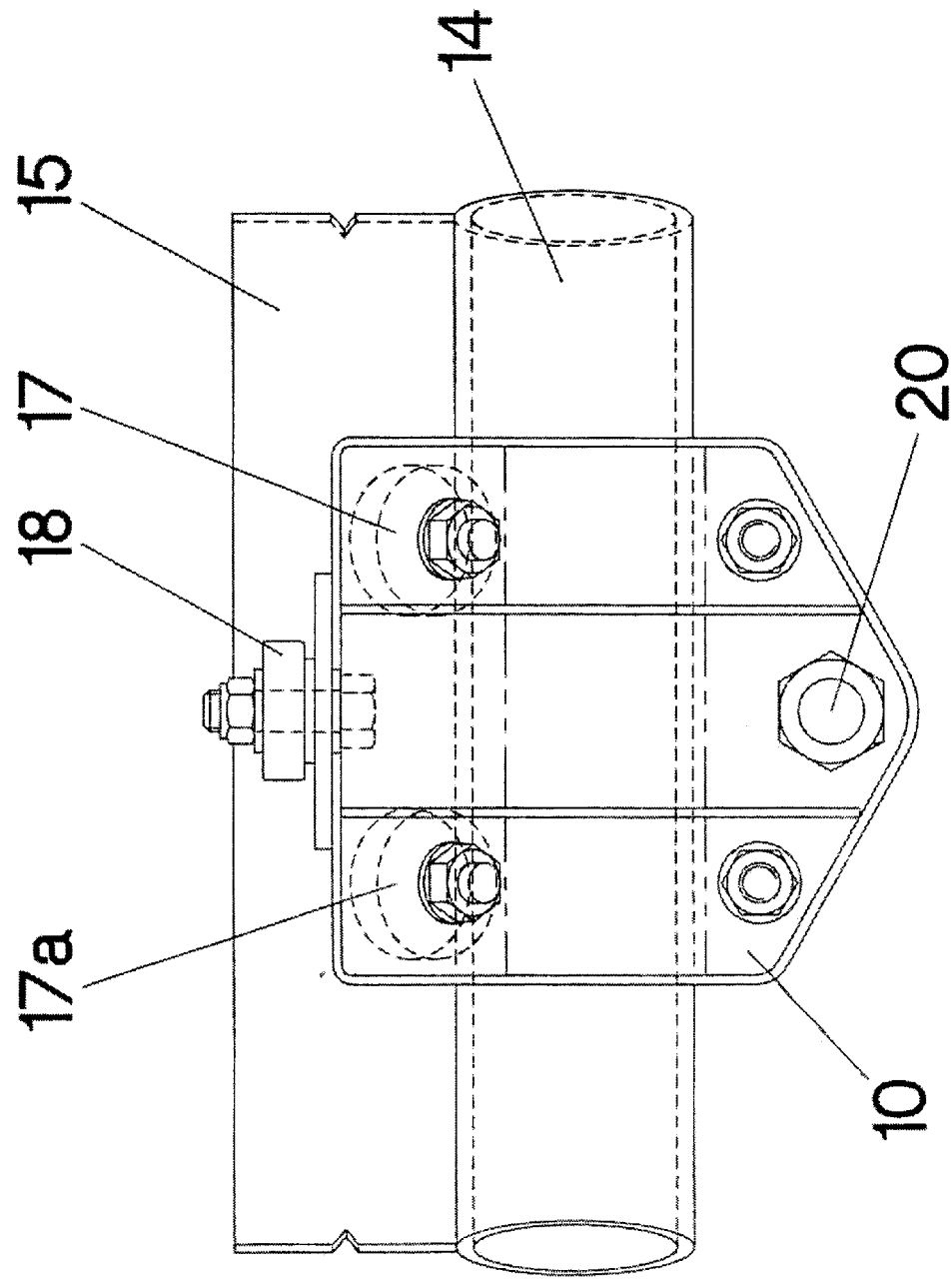
FIG. 5 is a side elevation of a carriage of the system of FIGS. 1–4 hereof.

A further pair of wheels 17a are disposed as depicted in FIG. 5 in order to prevent undue pivoting of the carriage about the rails longitudinal axis out of the depicted alignment with respect to pipe 14 with one of the wheels contacting each side of pipe 14. It should be appreciated that in heavier duty applications the number of roller wheels may be increased. A small tolerance may be provided to facilitate some rotation of the carriage in a transverse plane with respect to the rail although any significant rotation of the load about the rail is accommodated by pivot 19.

It has been found that the circular cross section rail suspended as depicted is far superior to a conventional 'I' beam monorail as uneven loading of the rail due to off-centre loads or otherwise which cause jamming or structural failure of 'I' beam monorails do not result in jamming or structural failure of a circular cross section rail. A circular cross-sections hollow tubular rail lends itself to a simple joining system as above described and is furthermore relatively light. It is not essential however that the rail be hollow as a solid aluminium rail could be constructed.

Neither is the system of wheels above described essential to the present invention as trolleys may also be supported by guide rollers, ball-bearings or other such load bearing relative motion facilitating low friction interfaces. Alternate embodiments could additionally involve wheels on one side of the frame only with the balance point of the frame being achieved by adjusting the centre of gravity in respect to the pivot point.

Conveyor systems in accordance with the present invention have been assessed and have been found to be most satisfactory particularly in so far as the monorail configuration is concerned. Of course it would have been possible to use a dual overhead rail although such systems are prone to jamming if the frames move out of a plane in which they are substantially perpendicular to the overhead rails. Where necessary, the frames may be chained or otherwise secured to tunnel walls in order to provide additional stability although in many cases this is not necessary and where it is necessary it is often not necessary to stabilise each and every frame.

The system may include one or more monorail-mounted compressed air or other powered locomotives to extend or compress the frames. The locking mechanism of caterpillar-action locomotives may be used between frames to perform a braking function thereby controlling unintended expansion or contraction in sloping applications.

In lieu of one or more locomotives a connection to mobile conveyor equipment may be employed whereby mining and/or loading equipment can effect compression or expansion of a system in accordance with the present invention. This connection should be load controlled to prevent the potentially large motive force of such mining equipment from exerting undue force onto either frames, rail or carriage components.

Figure 8:
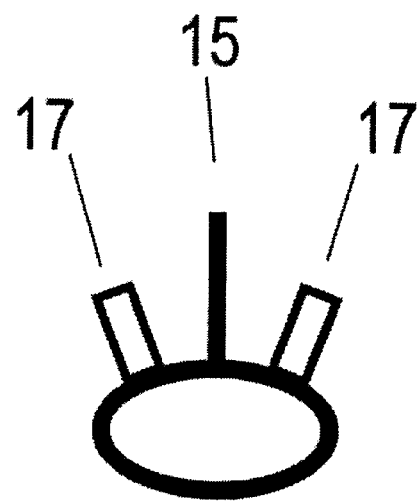
FIG. 8 is a partial end elevation of an oval cross section monorail in accordance with the present invention.
Figure 9:
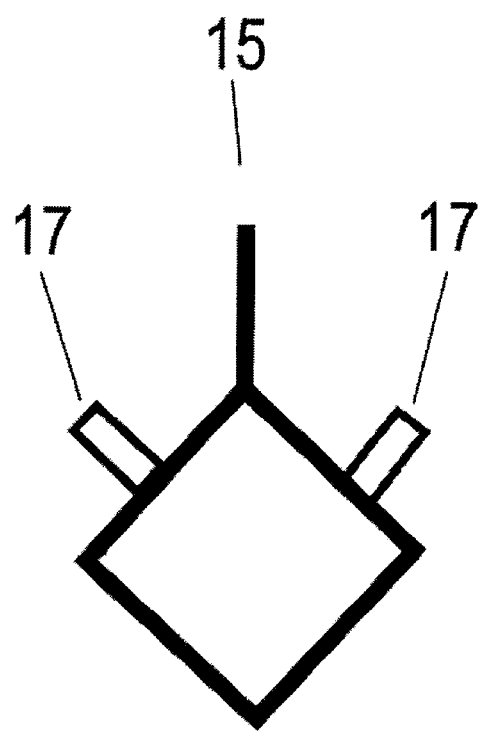
FIG. 9 is a partial end elevation at of a diamond cross section monorail in accordance with the present invention.
Figure 10:
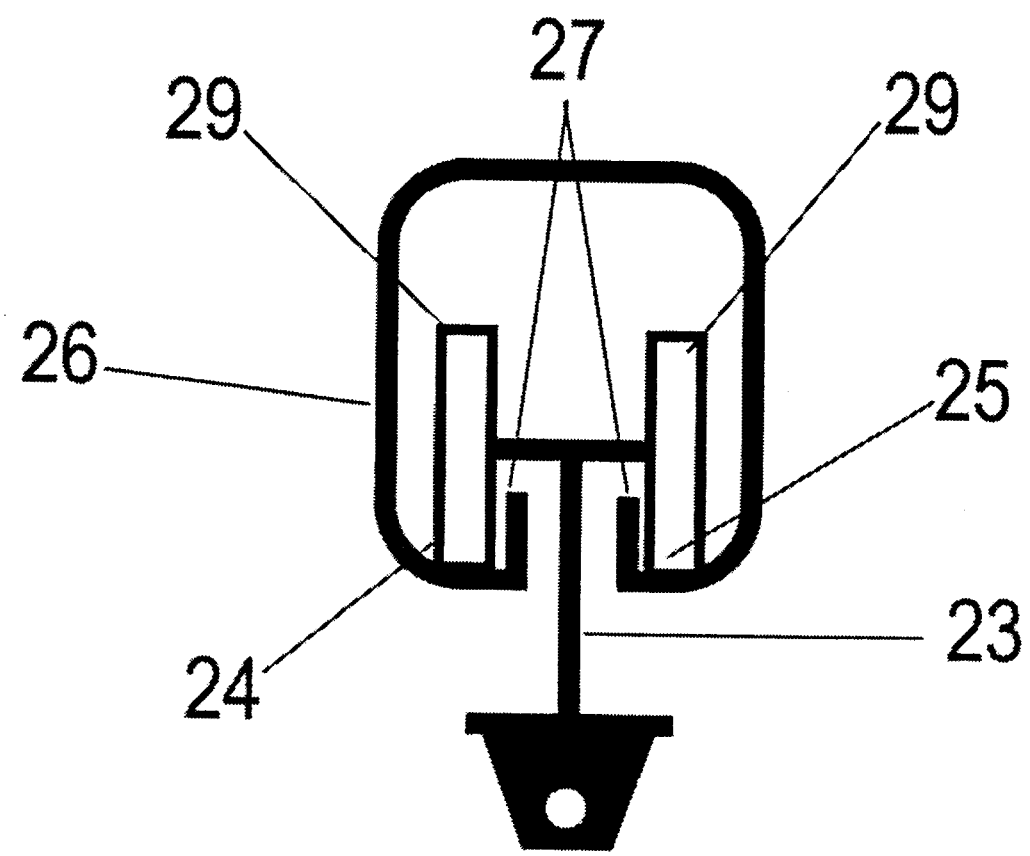
FIG. 10 is a partial end elevation of a monorail in accordance with the present invention incorporating internal carriage wheel tracks.

A monorail with a circular cross section is presently the preferred manner of constructing a system in accordance with the present invention but alternative embodiments of a monorail apart from the above-mentioned embodiment are contemplated which still fall within the scope of the present invention. For example the monorail may have one of the cross sections depicted in FIGS. 8 or 9 hereof. These embodiments are still tubular and still possess inclined upper surfaces upon which wheels such as are depicted at 17 may run. FIG. 8 depicts an oval section rail whereas FIG. 9 depicts a diamond section rail. Both the alternative embodiments depicted in FIGS. 8 and 9 would be suitable to shed falling debris such as is often present in mining and tunnelling operations as the upper surfaces upon which the carriage wheels are intended to run are inclined. FIG. 10 depicts a somewhat different approach to a monorail in accordance with the present invention in so far as the wheels 29 supporting the T-Section trolley 23 run on tracks defined by the internal surfaces 24 of the lowermost portions 25 of the rectangular section hollow rail 26 in conjunction with upturned flanges 27. The space between up turned flanges 27 defines a longitudinal slot 28 in the hollow rail 26 and consequently the rail is not a completely closed form in section. It will be appreciated that a rail such as is depicted in FIG. 10 would prevent debris settling on surfaces 24 along which wheels 29 must run freely.

Systems in accordance with the present invention may be utilised in conjunction with conventional fixed conveyor systems in order to provide versatile additions to same or alternatively they may be used to replace entire conventional systems.

Although a system in accordance with the present invention has been devised with long wall coal mining in mind it will be appreciated that the system is equally applicable to many other conveyor systems, particularly those that are underground.

It will further be appreciated that alternate embodiments of the present invention may be devised apart from that above described with reference to FIGS. 1–10 hereof without departing from the scope and intendment of the invention.

The claims defining the invention are as follows:

1. A support system for a conveyor comprising an overhead monorail of substantially closed form cross section pipe; carriages adapted to pass up and down the rail having load bearing, relative motion facilitating, low friction means adapted to run along one or more surfaces of the rail; hanging frames suspended from the carriages having guide and support rollers beneath their point of attachment with the carriages; the guide and support rollers being adapted to carry and guide an endless conveyor; means to slide the carriages and associated frames longitudinally along the rail so as to increase or decrease the spacing between adjacent frames and hence the length of the conveyor; means to attach the rail to an overhead support and means to lengthen or shorten the rail by adding or removing lengths of rail.

2. A system in accordance with claim 1 hereof wherein the hanging frames are suspended from the carriages by a pivot in such a manner that they may undergo arcuate movement about the carriages in a plane substantially normal to that of the rail.

3. A system in accordance with claim 1 hereof wherein the hanging frames are suspended from the carriages by a first pivot in such a manner that they may undergo arcuate movement about the carriages in a plane substantially normal to that of the rail and a second pivot in order that the frames may be free to undergo limited arcuate movement with respect to the carriages in a plane parallel to the rail.

4. A system in accordance with claim 1 hereof wherein the frames are substantially "e" shaped in configuration.

5. A system in accordance with claim 1 hereof including frames of both "e" shaped configuration and "o" shaped configuration.

6. A system accordance with claim 1 hereof including frames with either an "e" shaped configuration or an "o" shaped configuration wherein belt insertion and removal from the frame is facilitated by a removable section of frame which is provided with releasable fixing means at union's where it meets the main body of the frame.

7. A system in accordance with claim 1 hereof wherein adjacent frames may be maintained at a predetermined maximum a distance from each other along the rail by cables, ropes, chains or linkage arms.

8. A system in accordance with claim 1 hereof wherein a circular cross-section rail is provided with a continuous flat bar welded thereto in a vertical orientation normal to a tangent to the circular cross-section rail; the flat bar facilitating the attachment of overhead fixings without interference with the path of carriages along the rail.

9. A system in accordance with claim 1 hereof wherein a circular cross-section rail is provided with a continuous flat bar welded thereto in a vertical orientation normal to a tangent to the secular cross-section rail; the flat bar facilitating the attachment of overhead fixings without interference with the path of carriages along the rail; an additional set of wheels on each carriage adapted to run one or more on either side of the flat bar.

10. A system in accordance with claim 1 hereof wherein the rollers on the frames are staggered either side of the frames in order to facilitate even loading of the frames and maximum support for the conveyor belt.

11. A system in accordance with claim 1 hereof wherein the load bearing, relative motion facilitating, low friction means are wheels on the carriages adapted to run along the external upper surfaces of a substantially circular cross section rail which wheels are angled at between 30 degrees and 60 degrees to the vertical.

12. A system in accordance with claim 1 hereof wherein the load bearing, relative motion facilitating, low friction means are wheels on the carriages adapted to run along the external upper surfaces of a substantially circular cross section rail which wheels are angled at between 35 degrees and 45 degrees to the vertical.

13. A system in accordance with claim 1 hereof wherein each carriage contains two sets of wheels adapted to run on the upper surfaces of the rail with each set comprising one pair of wheels, one on each side of the rail.

14. A system in accordance with claim 1 hereof wherein there are monorail mounted locomotives adapted to extend or compress frame spacing by driving the frames along the rail.

15. A system in accordance with claim 1 hereof wherein there are monorail mounted locomotives adapted to extend or compress frame spacing by driving the frames along the rail and also to anchor frames with respect to the rail by utilising the a locking feature associated with the locomotive.

16. A system in accordance with claim 1 hereof wherein the rail is comprised of separate discrete sections of circular cross section rail releasably locked together by a mechanism that can accommodate angular misalignment in the transverse plane such as a bayonet type fitting.

17. A system in accordance with claim 1 hereof wherein the rail is circular in cross section and is comprised of separate discrete sections of pipe attached to each other by bayonet type fittings associated with the ends of each section of rail.

18. A system in accordance with claim 1 hereof wherein the load bearing, relative motion facilitating, low friction means are wheels supporting a T-Section carriage and running on tracks defined by the internal surfaces of the lowermost portions of a substantially rectangular section hollow rail in conjunction with adjacent upturned flanges; The space between upturned flanges defining a longitudinal slot in the hollow rail.

* * * * *